(12) United States Patent
Komorowski et al.

(10) Patent No.: US 6,364,795 B1
(45) Date of Patent: Apr. 2, 2002

(54) BELT TENSIONER AND METHOD OF INSTALLING THE SAME

(75) Inventors: Jacek S. Komorowski, Bond Head; Marek Frankowski, Stroud, both of (CA)

(73) Assignee: Litens Automotive Partnership, Woodbridge (CA)

(*) Notice: Subject to any disclaimer, the term of this patent is extended or adjusted under 35 U.S.C. 154(b) by 0 days.

(21) Appl. No.: 09/396,794

(22) Filed: Sep. 15, 1999

Related U.S. Application Data

(60) Provisional application No. 60/100,836, filed on Sep. 18, 1998, and provisional application No. 60/144,008, filed on Jul. 15, 1999.

(51) Int. Cl.[7] .............................................. F16H 07/10
(52) U.S. Cl. ........................................ 474/42; 474/135
(58) Field of Search ................................ 474/101, 109, 474/112, 133, 135, 138

(56) References Cited

U.S. PATENT DOCUMENTS

| | | | |
|---|---|---|---|
| 4,832,665 A | 5/1989 | Kadota et al. | 474/112 |
| 4,889,520 A | * 12/1989 | Brandenstein et al. | 474/135 |
| 4,917,655 A | * 4/1990 | Martin | 474/112 |
| 4,923,435 A | 5/1990 | Kadota et al. | 474/112 |
| 4,934,987 A | 6/1990 | Kadota et al. | 474/112 |
| 4,957,471 A | 9/1990 | St. John | 474/133 |
| 5,078,656 A | 1/1992 | Brandenstein et al. | 474/112 |
| 5,186,689 A | 2/1993 | Yamamoto et al. | 474/112 |
| 5,207,620 A | 5/1993 | Yamamoto et al. | 474/135 |
| 5,244,438 A | 9/1993 | Golovatai-Schmidt | 474/112 |
| 5,266,067 A | 11/1993 | Gapco | 474/112 |
| 5,354,242 A | * 10/1994 | St. John | 474/135 |
| 5,370,585 A | 12/1994 | Thomey et al | 474/112 |
| 5,399,124 A | 3/1995 | Yamamoto et al. | 474/94 |

FOREIGN PATENT DOCUMENTS

| | | |
|---|---|---|
| EP | 0780597 A1 | 6/1997 |
| WO | WO83/02308 | 7/1983 |
| WO | WO98/08004 | 2/1998 |

* cited by examiner

*Primary Examiner*—David A. Bucci
*Assistant Examiner*—Vicky A. Johnson
(74) *Attorney, Agent, or Firm*—Pillsbury Winthrop LLP

(57) ABSTRACT

A belt tensioner for tensioning a belt for a motor vehicle comprises a pivot shaft, a pivoting structure mounted for pivotal movement on the pivot shaft, and a pulley mounted for rotation on the pivoting structure. A spring biases the pivoting structure in a direction that moves the pulley mounted on the pivoting structure into tensioning engagement with the belt. A bolt is constructed and arranged to mount the belt tensioner on the motor vehicle engine mount. The bolt is constructed and arranged to be tightened to a predetermined extent for installing the tensioner of the motor vehicle, the predetermined extent is the same extent to which the bolt is tightened during normal operation of the tensioner. A clamping structure applies a predetermined clamping force on the pivot shaft after the bolt is tightened to the predetermined extent. The predetermined clamping force is sufficiently large to maintain the pivot shaft in perpendicular relation to the engine mount and prevent tilting of the pivot shaft when the tensioner is moved into installed tensioning engagement with the belt, yet sufficiently small to permit manual movement of the pivot shaft relative to the mounting bolt for adjusting the amount of tension applied by the tensioner to the belt.

13 Claims, 2 Drawing Sheets

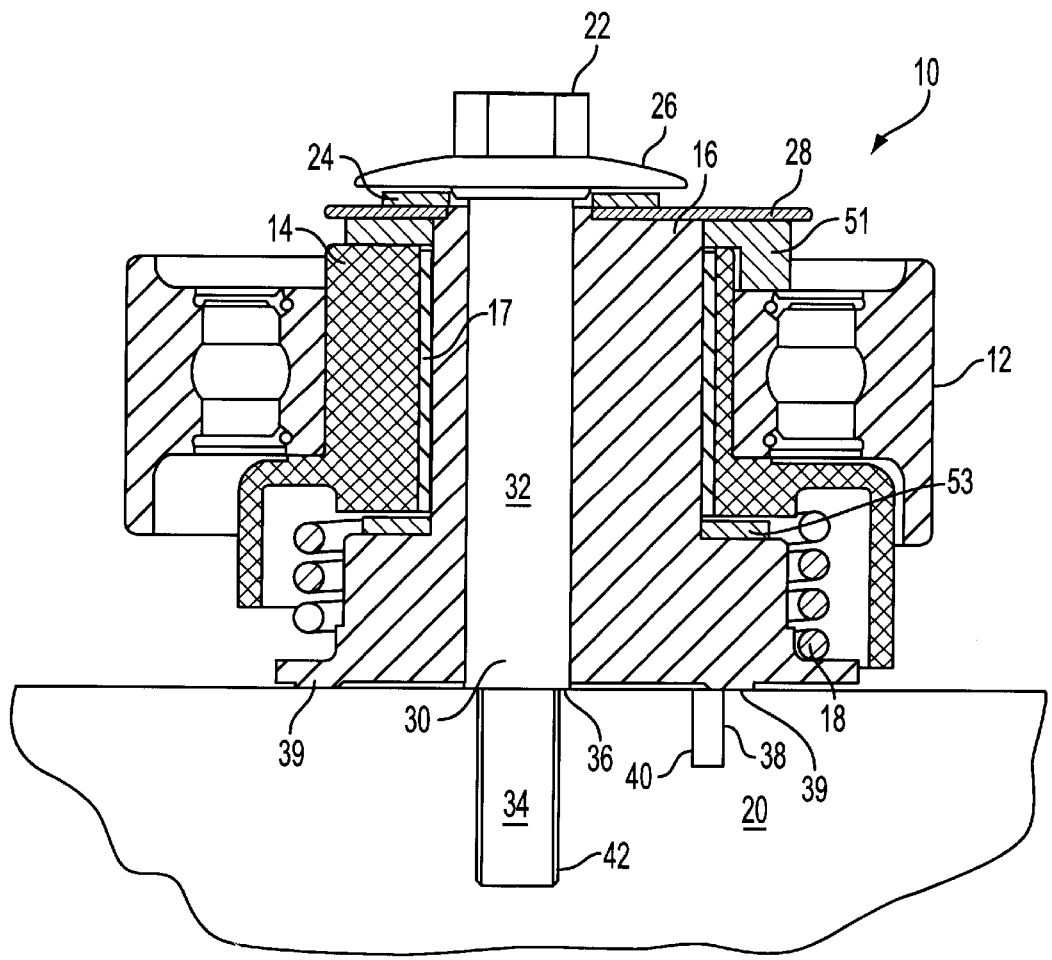
FIG. 1
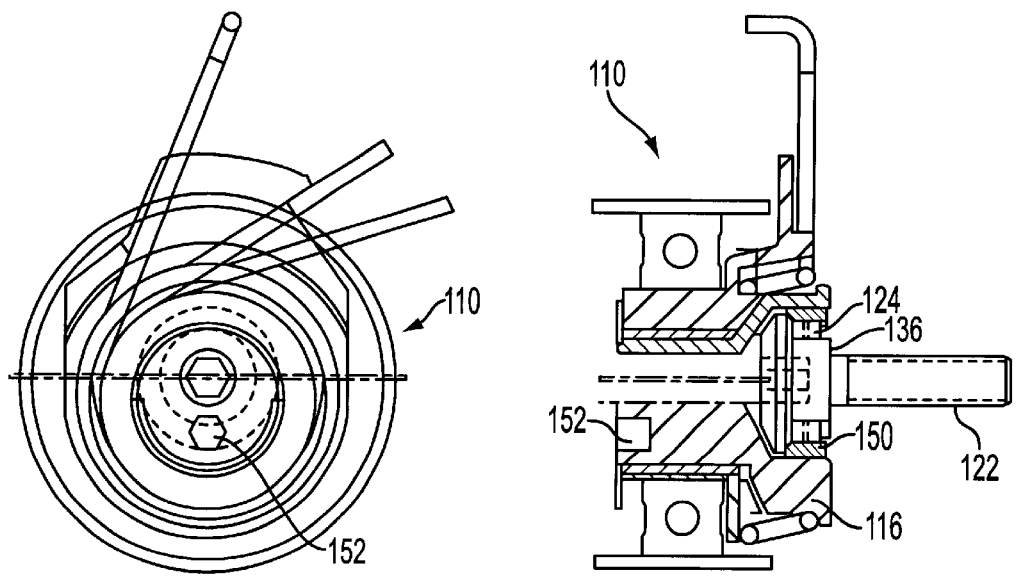
FIG. 3
FIG. 2

BELT TENSIONER AND METHOD OF INSTALLING THE SAME

This application claims the benefit of U.S. Provisional Application No. 60/100,836, filed Sep. 18, 1998 and of 60/144,008, filed Jul. 15,1999.

FIELD OF THE INVENTION

The present invention relates to a belt tensioner for an automotive engine and a method for mounting the same.

BACKGROUND OF THE INVENTION

Timing belt tensioners, such as the tensioners described in U.S. Pat. No. 4,824,421, entitled: "Belt Tensioner with Releasable Belt Damping Loads", hereby incorporated by reference, are mounted directly onto the vehicle engine block. The standard procedure for installing such tensioners is to tighten the mounting bolt to finger tightness, train the belt around the tensioner, adjust the tensioner arm position relative to the nominal position so that the tensioner is in desired tensioning engagement with the belt, and then fully tighten the mounting bolt.

The current procedure for mounting timing belt tensioners is not always satisfactory for a number of reasons. First, tightening of the mounting bolt after adjusting the tensioner arm causes motion of the pivot shaft thereby reducing the accuracy of the adjusted position of the tensioner and thus the pre-load of the tensioner. Second, the mounting bolt is not fully tightened when the tensioner is initially moved into desired tensioning engagement with the belt, and therefore the bolt will tilt under the force of the belt. When the mounting bolt is tightened, it will move to be fully perpendicular to the engine mounting surface, altering the desired static tension that the tensioner applies to the belt. Third, in removing the tensioner for repair or replacement, the belt load will act on the tensioner as the mounting bolt is being removed, resulting in damage to the screw threads of the mounting bore on the tensioner mount.

SUMMARY OF THE INVENTION

The disadvantages of the prior art may be overcome by providing a belt tensioner for an automotive engine, wherein the tensioner pivot shaft is mounted in such a manner that it is firmly mounted on the engine without tilting, before and during installation adjustment, and during normal engine operation. In addition, the tensioner pivot shaft can be manually adjusted during installation to permit proper tensioning of the belt.

The present invention also provides a method for mounting a tensioner whereby the tensioner is firmly mounted to the engine prior to adjustment for pre-loading the tensioner into tensioning engagement with the belt.

According to one aspect of the invention, there is provided a tensioner, a stepped mounting bolt and a spring washer. The mounting bolt is inserted through the spring washer and then inserted through the tensioner and firmly tightened a predetermined amount to clamp the tensioner to a tensioner mounting surface. The bias of the spring washer produces a predetermined frictional torque resistant force which secures the tensioner in place before adjustment and during normal engine operation while allowing a limited amount of angular rotation of the pivot shaft to nominally bias the tensioner against the timing belt.

In accordance with another aspect of the invention, there is provided a belt tensioner for tensioning a belt for a motor vehicle, comprising a pivot shaft, a pivoting structure mounted for pivotal movement on the pivot shaft, and a pulley mounted for rotation on the pivoting structure. A spring biases the pivoting structure in a direction that moves the pulley mounted on the pivoting structure into tensioning engagement with the belt. A bolt is constructed and arranged to mount the belt tensioner on the motor vehicle engine mount. The bolt is constructed and arranged to be tightened to a predetermined extent for installing the tensioner of the motor vehicle. The predetermined extent is the same extent to which the bolt is tightened during normal operation of the tensioner. A clamping structure applies a predetermined clamping force on the pivot shaft after the bolt is tightened to the predetermined extent. The predetermined clamping force is sufficiently large to maintain the pivot shaft in perpendicular relation to the engine mount and prevent tilting of the pivot shaft when the tensioner is moved into installed tensioning engagement with the belt, yet sufficiently small to permit manual movement of the pivot shaft relative to the mounting bolt for adjusting the amount of tension applied by the tensioner to the belt.

A further aspect of the invention relates to a belt tensioner wherein the bolt comprises a shoulder that limits tightening of the bolt to a predetermined extent.

A further aspect of the invention relates to a method for installing a belt tensioner for tensioning a belt for a motor vehicle. The method comprises a pivot shaft and a pivoting structure mounted for pivotal movement on the pivot shaft. A pulley is mounted for rotation on the pivoting structure with a spring biasing the pivoting structure in a direction that moves the pulley mounted on the pivoting structure into tensioning engagement with the belt. A bolt is constructed and arranged to mount the belt tensioner on the motor vehicle engine mount; and a clamping structure. The method further comprises mounting the tensioner on the motor vehicle engine with the bolt; tightening the bolt so that the clamping structure applies a predetermined clamping force on the pivot shaft, which predetermined clamping force is sufficiently large to maintain the pivot shaft in perpendicular relation to the engine mount and prevent tilting of the pivot shaft when the tensioner is moved into installed tensioning engagement with the belt, yet sufficiently small to permit manual movement of the pivot shaft relative to the mounting bolt for adjusting the amount of tension applied by the tensioner to the belt.

Other objects and advantages of the present invention will become apparent from the following detailed description and appended drawings illustrating the preferred embodiments.

BRIEF DESCRIPTION OF THE DRAWINGS

FIG. 1 is a sectional view of a tensioner incorporating a mounting assembly of the present invention.

FIG. 2 is a sectional view of a second embodiment of a tensioner incorporating the mounting assembly of the present invention;

FIG. 3 is a top plan view of the tensioner assembly of the embodiment of FIG. 2.

DETAILED DESCRIPTION OF THE INVENTION

Figure 4:
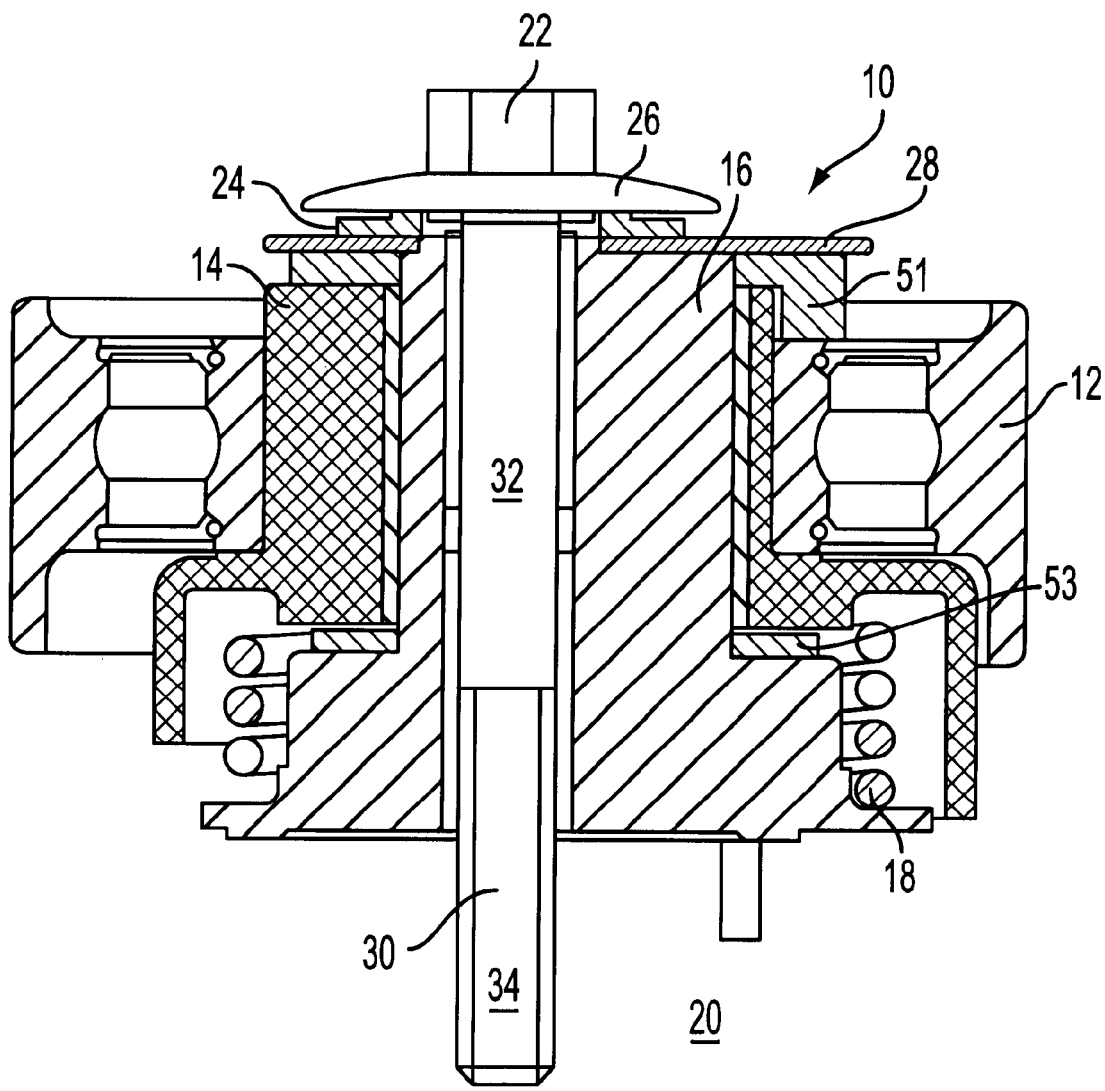
FIG. 4 is a sectional view of a third embodiment of a tensioner incorporating a mounting assembly of the present invention.

Referring to FIG. 1, there is illustrated a tensioner 10 of the present invention. The tensioner 10 generally comprises a pulley 12 journal mounted on a pivoting arm 14 which is pivotally mounted on a pivot shaft 16. A plastic sleeve bearing 17 between the arm 14 and pivot shaft 16 reduces wear of these components during tensioner operation. The arm 14 is also mounted axially between bearing members 51 and 53. Coil spring 18 is mounted about the pivot shaft 16 and extends between the pivoting arm 14 and the tensioner mount 20. Tensioner mount 20 includes either the engine block, head, a tensioner mounting bracket or plate fixed with respect to the engine block. One end of the spring 18 is fixed relative to the mount 20, the other end engages the pivot arm 14 to pivot the arm 14 about the shaft 16. Bolt 22 extends through the pivot shaft 16 to threadingly engage the tensioner mount 20 mounting the tensioner 10 thereto.

A spring washer 24 is mounted between the head flange 26 of bolt 22 and the upper housing plate 28 of the tensioner 10, Spring washers are well known in the art and are commercially available.

Bolt 22 has a stepped diameter shaft 30 extending from the head flange 26. A first length 32 of the bolt has a diameter which is slidingly received within the central bore of the pivot shaft 16 and has a length which is slightly greater than the thickness of the tensioner 10. A second length 34 of the bolt which is distal from the head flange 26 is threaded and has a diameter which is less than that of the first length 32, thereby presenting circumferential shoulder 36.

The length of the first length 32 between the head flange 26 and shoulder 36, and the sizing and tensioning force of the spring washer 24 are significant factors in the first embodiment of the present invention. The length of first length 32 should be sized to accommodate mounting of the tensioner and the spring washer 24, and yet allow sufficient room for the spring washer 24 to partially compress between the head flange 26 and the housing plate 28 so as to provide a predetermined frictional clamping force between the housing plate 28 and the pivot shaft 16 to prevent rotation of the pivot shaft 16 during operation of the tensioner after installation. The predetermined force applied by the spring washer 24 is also sufficient to clamp the tensioner in place so that the pivot shaft is retained perpendicularly to the mount 20 even after the belt is trained about the tensioner and the pivot shaft 16 is manually rotated so that the arm pivots to move the pulley 12 into desired tensioning engagement with the belt. In other words, the spring 24 applies sufficient force through the tensioner to prevent tilting of the pivot shaft 16 under the belt load force applied by the belt to the tensioner during installation and operation of the tensioner. In this regard, the bottom annular surface 39 of pivot shaft 16 should be sufficiently large in diameter to facilitate this anti-tilting function.

While the predetermined force applied by the spring washer must be sufficiently large to accomplish the above anti-tilting aspect of the pivot shaft 16 both during and after installation, and to resist unwanted rotation of the pivot shaft during operating of the tensioner as a result of the belt load force, the predetermined force must be sufficiently small to allow an operator to angularly rotate the pivot shaft 16 about the bolt 22 during installation of the tensioner to initially pre-load the tensioner 10 against the belt. The spring washer 24 is able to provide the requisite predetermined clamping forces and torque resistant forces because the belt load of a timing belt acting through a relatively short arm produces a relatively low torque on the pivot shaft 16. The shoulder 36 limits the amount of clamping force that can be applied by the spring washer 24 to the predetermined clamping force.

To install a tensioner 10, the spring washer 24 is presented to the mounting bolt 22 and the bolt 22 is then inserted through the central bore of the pivot shaft 16. The tensioner 10 is presented to the tensioner mount 20 by inserting the end 38 of spring 18 into a spring receiving bore 40 on the tensioner mount 20. The mounting bolt 22 is threadingly engaged with the threaded bore 42 on the tensioner mount 20. The mounting bolt 22 is fully tightened until shoulder 36 abuts with the tensioner mount 20. The tightening action will compress the spring washer 24 to a predetermined extent as limited by shoulder 36 abutting mount 20 to firmly engage the tensioner 10. The tensioner 10 will firmly engage the tensioner mount 20 with sufficient force under action of spring 24 to ensure perpendicularity of the pivot shaft 16 relative to the mount 20. The pivot shaft 16 is then manually rotated to adjust the angular position thereof (the limited/controlled amount of clamping force applied by spring 24 permitting this) until the arm 14 reaches a nominal position, pre-loading the tensioner against the timing belt (not illustrated).

To remove the tensioner 10, the steps are reversed. A further advantage of the present invention is that the load of the belt against the tensioner 10 is removed, allowing the mounting bolt 22 to be removed in an unloaded condition minimizing the likelihood of damage to the screw threads of the threaded bore 42.

The present invention provides a simple three step process for installing the tensioner and properly pre-loading the tensioner. In particular, the process of the present invention avoids the post adjustment bolt-tightening step common in prior art installations, which step is the source of many of the deficiencies of the prior art. Additionally, the installation process of the present invention allows the tension to the belt applied by tensioner to be adjusted by manual rotation of the pivot shaft 16 while the engine is in operation and allows for automated installation.

Referring now to FIGS. 2 and 3, a second embodiment of a tensioner 110 is illustrated. The tensioner 110 has same corresponding components as the tensioner 10, except that the central bore of the pivot shaft 116 has a counter bore on the underside thereof for receiving the head of bolt 122. The spring washer 124 presses against a press ring 150 which retains the bolt 122 within the counter bore in a sliding fit.

The tensioner 110 is installed in a similar manner as described above. Upon tightening the mounting bolt 122, the mounting bolt 122 will engage the spring washer 124, which will resiliently engage an inner lip of the press ring 150. Simultaneously, the shoulder 136 of the mounting bolt 122 will abut against the tensioner mount 20 to firmly yet resiliently secure the tensioner 110 thereto.

Optionally, a hex shaped opening 152 may be provided in the upper surface of the tensioner 110. A hex wrench could be used to provide mechanical advantage in rotating the pivot shaft 116 against the frictional torque resistant forces generated by the bias of the spring washer 124.

This embodiment employs the bias of spring washer 124 against the press ring 150, and friction between the press ring 150 and the pivot shaft 116 to maintain the perpendicularity of pivot shaft 116 and to prevent unwanted pivotal movement of pivot shaft 116 about the bolt 122 during tensioner operation. However, manual pivotal movement of shaft 116 is permitted during operation or installation adjustment, even after bolt 122 has been fully tightened. In this embodiment, the belt load force applied by the belt against the tensioner enhances the frictional engagement between pivot shaft 116 and press ring 150.

FIG. 4 illustrates a third embodiment of the present invention. This embodiment is very similar to the first embodiment, except that a generally straight mounting bolt, without any shoulder to abut the mount 20 is employed. Instead, to limit the amount of clamping force applied by the spring washer 24, a torque wrench having a torque indicator or limit switch is utilized to tighten the bolt 22 to a predetermined desired extent, that will cause the spring washer 24 to apply the desired predetermined axial clamping force to the pivot shaft 16. Again, this clamping force will ensure the perpendicularity of shaft 16, prohibit rotation of pivot shaft 16 during normal tensioner operation, yet permit manual rotation of pivot shaft 16 during initial installation or even during tensioner operation to adjust the amount of tension applied to the belt.

While the invention has been described in connection with what is presently considered to be the most practical and preferred embodiments, it is understood that the invention is not limited to the disclosed embodiments but, on the contrary, it is intended to cover various modifications in the arrangements within the scope of the following claims.

What is claimed is:

1. A belt tensioner for tensioning a belt on a motor vehicle engine, said belt tensioner configured to be mounted to a tensioner mount and comprising: a pivot shaft;
    a pivoting member pivotally mounted on said pivot shaft;
    a pulley rotationally mounted on said pivoting member;
    a spring configured and disposed so as to bias said pivoting structure and said pulley toward the belt when the tensioner is installed on the tensioner mount and the belt is installed on the motor vehicle engine;
    a mounting bolt configured and disposed for mounting the belt tensioner to the tensioner mount, said mounting bolt being configured to be tightened down to the tensioner mount to a predefined extent when installing the tensioner on the tensioner mount; and a resilient clamping member configured and disposed so as to apply a predetermined, axially oriented clamping force against said pivot shaft after said mounting bolt has been tightened down to the tensioner mount to said predefined extent, said predetermined clamping force holding said pivot shaft against said tensioner mount and being large enough to maintain the pivot shaft in perpendicular relation to the tensioner mount when the tensioner is subjected to belt loads, thereby preventing tilting of the pivot shaft when the tensioner is moved into installed, tensioning engagement with the belt, and said predetermined clamping force being small enough to permit manual rotational movement of the pivot shaft relative to the mounting bolt so as to adjust the amount of tension applied by the tensioner to the belt.

2. A belt tensioner according to claim 1, wherein said predefined extent is the same as the extent to which the mounting bolt is tightened for normal operation of the tensioner.

3. A belt tensioner according to claim 1, wherein said mounting bolt has a shoulder which determines the predefined extent to which said mounting bolt can be tightened down to the tensioner mount.

4. A belt tensioner according to claim 1, wherein said clamping member is configured to cooperate with said belt to generate and apply said predetermined clamping force to said pivot shaft.

5. A belt tensioner according to claim 1, wherein said clamping member comprises a spring washer and wherein the amount of force said spring washer applies against said pivot shaft is determined, in part, by the predefined extent to which the mounting bolt is tightened down to the tensioner mount.

6. A belt tensioner according to claim 5, wherein said spring washer is disposed between a head of said mounting bolt and said pivot shaft.

7. A belt tensioner according to claim 5, wherein said spring washer is configured to apply said predetermined clamping force against said pivot shaft in an axial direction.

8. A belt tensioner according to claim 5, wherein said spring washer is configured to apply a clamping force against said pivot shaft in a radial direction.

9. A belt tensioner according to claim 8, wherein a belt load force applied by said belt causes frictional clamping forces to be created in said radial direction whereby the belt cooperates with said clamping member to generate and apply said predetermined clamping force against said pivot shaft.

10. A belt tensioner for tensioning a belt on a motor vehicle engine, said belt tensioner configured to be mounted to a tensioner mount and comprising:
    a pivot shaft;
    a pivoting member pivotally mounted on said pivot shaft;
    a pulley rotationally mounted on said pivoting member;
    a spring configured and disposed so as to bias said pivoting structure and said pulley toward the belt when the tensioner is installed on the tensioner mount and the belt is installed on the motor vehicle engine;
    a mounting bolt configured and disposed for mounting the belt tensioner to the tensioner mount; and
    a resilient clamping member configured and disposed so as to apply a predetermined, axially oriented clamping force against said pivot shaft after said mounting bolt has been tightened down to the tensioner mount to a predetermined torque setting of a torque wrench, said predetermined clamping force holding said pivot shaft against said tensioner mount and being large enough to maintain the pivot shaft in perpendicular relation to the tensioner mount when the tensioner is subjected to belt loads, thereby preventing tilting of the pivot shaft when the tensioner is moved into installed, tensioning engagement with the belt, and said predetermined clamping force being small enough to permit manual rotational movement of the pivot shaft relative to the mounting bolt so as to adjust the amount of tension applied by the tensioner to the belt.

11. A method for installing a belt tensioner for tensioning a belt on a motor vehicle engine, said belt tensioner comprising a pivot shaft; a pivoting member pivotally mounted on said pivot shaft; a pulley rotationally mounted on said pivoting member; a spring configured and disposed so as to bias said pivoting structure and said pulley toward the belt when the tensioner is installed on the tensioner mount and the belt is installed on the motor vehicle engine; a mounting bolt; and a resilient clamping member; said method comprising:
    positioning said tensioner on a tensioner mount and fastening said tensioner to said tensioner mount using said mounting bolt;
    tightening said mounting bolt until said clamping member applies a predetermined, axially oriented clamping force against said pivot shaft, said predetermined clamping force holding said pivot shaft against said tensioner mount and being large enough to maintain the pivot shaft in perpendicular relation to the tensioner mount when the tensioner is subjected to belt loads, thereby preventing tilting of the pivot shaft when the tensioner is moved into installed, tensioning engagement with the belt, and said predetermined clamping force being small enough to permit manual rotational movement of the pivot shaft relative to the mounting bolt so as to adjust the amount of tension applied by the tensioner to the belt; training the belt around said tensioner; and then manually adjusting the pivot shaft after said tightening to establish a desired level of tension in the belt.

12. A method according to claim 11, wherein said mounting bolt is configured to be tightened down to the tensioner mount to a predefined, limited extent, said predefined, limited extent being such as to cause said clamping member to apply said predetermined clamping force, said method comprising tightening said mounting bolt down to the tensioner mount to said predefined, limited extent.

13. A method according to claim 11, said method comprising tightening said mounting bolt down to the tensioner mount to a predetermined torque setting of a wrench, said predetermined torque setting being selected to cause said clamping member to generate and apply said predetermined clamping force.

* * * * *